United States Patent
Nakajima

[11] Patent Number: 5,907,097
[45] Date of Patent: May 25, 1999

[54] METHOD OF AND DEVICE FOR DETECTING TIRE PRESSURE DROP

[75] Inventor: Mikao Nakajima, Osaka, Japan

[73] Assignees: Sumitomo Electric Industries, Ltd., Osaka; Sumito Rubber Industries, Ltd., Hyogo, both of Japan

[21] Appl. No.: 08/925,087

[22] Filed: Sep. 8, 1997

[30] Foreign Application Priority Data

Sep. 27, 1996 [JP] Japan .................................. 8-255750

[51] Int. Cl.$^6$ .......................... B60C 23/02; B60C 23/00
[52] U.S. Cl. ........................ 73/146.2; 73/146.5; 340/444
[58] Field of Search .............................. 73/146.2, 146.5; 340/444; 701/91, 93

[56] References Cited

U.S. PATENT DOCUMENTS

| | | | |
|---|---|---|---|
| 5,345,217 | 9/1994 | Prottey | 73/146.5 |
| 5,569,848 | 10/1996 | Sharp | 73/146.2 |
| 5,604,307 | 2/1997 | Iida et al. | 73/146.2 |
| 5,629,478 | 5/1997 | Nakajima et al. | 73/146.2 |
| 5,724,266 | 3/1998 | Kishimoto et al. | 73/146.2 |
| 5,734,319 | 3/1998 | Stephens et al. | 73/146.2 |

FOREIGN PATENT DOCUMENTS 63-305011  12/1988  Japan.
4-212609   8/1992   Japan.

*Primary Examiner*—Richard Chilcot
*Assistant Examiner*—Robin C. Clark
*Attorney, Agent, or Firm*—Rabin & Champagne, P.C.

[57] ABSTRACT

A tire pressure drop detecting method, which executes a pneumatic pressure drop judging processing for autocruise traveling when the vehicle is in a state of autocruise traveling. It is judged based on a front/rear acceleration of the vehicle whether the vehicle is in a state of autocruise traveling or not. Furthermore, the pneumatic pressure drop judging processing for autocruise traveling is performed by using a judging threshold value which is set to become smaller as the speed of the vehicle becomes larger.

14 Claims, 6 Drawing Sheets

METHOD OF AND DEVICE FOR DETECTING TIRE PRESSURE DROP

BACKGROUND OF THE INVENTION

1. Field of the Invention

The present invention relates to a tire pressure drop detecting method and device for detecting whether the tire pressure drops or not, based on the rotational angular velocities of four tires provided for a four-wheel vehicle.

2. Description of Related Art

As one of the safety devices for a four-wheel vehicle such as automobile, truck, etc., devices for detecting a tire pressure drop (DWS) have recently been developed, and some of them have been put to practical use.

As one of methods of detecting a tire pressure drop, for example, there is a method of utilizing a difference in the respective rotational angular velocities $F_1$, $F_2$, $F_3$ and $F_4$ of four tires $W_1$, $W_2$, $W_3$ and $W_4$ provided for a vehicle. This method utilizes the fact that the rotational angular velocities $F_i$ (i=1, 2, 3, 4) vary depending on the state of the pneumatic pressure of the tire $W_i$. That is, when the pneumatic pressure of any tire $W_i$ drops, the effective rolling radius of the tire $W_i$ decreases. As a result, the rotational angular velocity $F_i$ of the tire $W_i$ becomes larger. Therefore, the pressure drop of the tire $W_i$ can be detected based on the difference in rotational angular velocities $F_i$ of four tires $W_i$.

Incidentally, the effective radius is a value obtained by dividing by $2\pi$ a travel distance of the vehicle while the tires make one free revolution.

One embodiment of a method of determining the pressure drop of a tire $W_i$ based on the difference in rotational angular velocities $F_i$ is as shown in the following equation (1) (e.g. see Japanese Laid-Open Patent Publication (KOKAI) Nos. 63-305011 and 4-212609).

$$D = \frac{\frac{F_1 + F_4}{2} - \frac{F_2 + F_3}{2}}{\frac{F_1 + F_2 + F_3 + F_4}{4}} \times 100 \quad (1)$$

If the effective rolling radiuses of four tires $W_i$ are equal, the respective rotational angular velocities $F_1$ are equal ($F_1=F_2=F_3=F_4$). Accordingly, the judged value D becomes 0. Then, threshold values $D_{TH1}$ and $D_{TH2}$ are set (provided $D_{TH1}$, $D_{TH2}>0$). If the condition shown in the following expression (2) is satisfied, it is judged that the tire $W_i$ whose pneumatic pressure has dropped is present. If this condition is not satisfied, it is judged that all of the tires $W_i$ have a normal inner pressure.

$$D<-D_{TH1}, \text{ or } D>D_{TH2} \quad (2)$$

However, there is a fear of causing an erroneous judgment according to the traveling state of the vehicle only by performing the pneumatic pressure drop judgment using the above expressions (1) and (2). For example, in case that the pneumatic pressure of any one of the right front and left front tires $W_i$, the tires to which a driving force is transmitted, has dropped, there is a fear of causing an erroneous judgment when the vehicle is traveling at comparatively high speed without decelerating (hereinafter referred such a traveling as to a "high-speed drive traveling").

That is, at the time of high-speed drive traveling, the slip rate of the tire $W_i$ whose pneumatic pressure has dropped is lowered, while the effective rolling radius is increased by a centrifugal force applied to the respective parts of the tire $W_i$. Therefore, the difference in rotational angular velocity between a tire $W_i$ having a normal inner pressure and a tire $W_i$ whose pneumatic pressure has dropped nearly disappears. As a result, the judged value D approaches zero in the form of the second order function as the speed V of the vehicle increases even if the pneumatic pressure of any tire $W_i$ has dropped, and hardly satisfy the condition of the above expression (2).

SUMMARY OF THE INVENTION

To cope with this problem, proposed in Japanese Patent Application No. 8-92311 (not published as of the day of filing the present application) is a technique of discriminating whether a vehicle is in a state of high-speed drive traveling or not after performing a pneumatic pressure drop judgment using the above expressions (1) and (2) (hereinafter referred to as a "low-speed adapted judgment") regardless of the speed V of the vehicle, and further performing a high-speed adapted judgment when it is found that the vehicle is in a state of high-speed drive traveling as a result of the above judgment.

Figure 6:
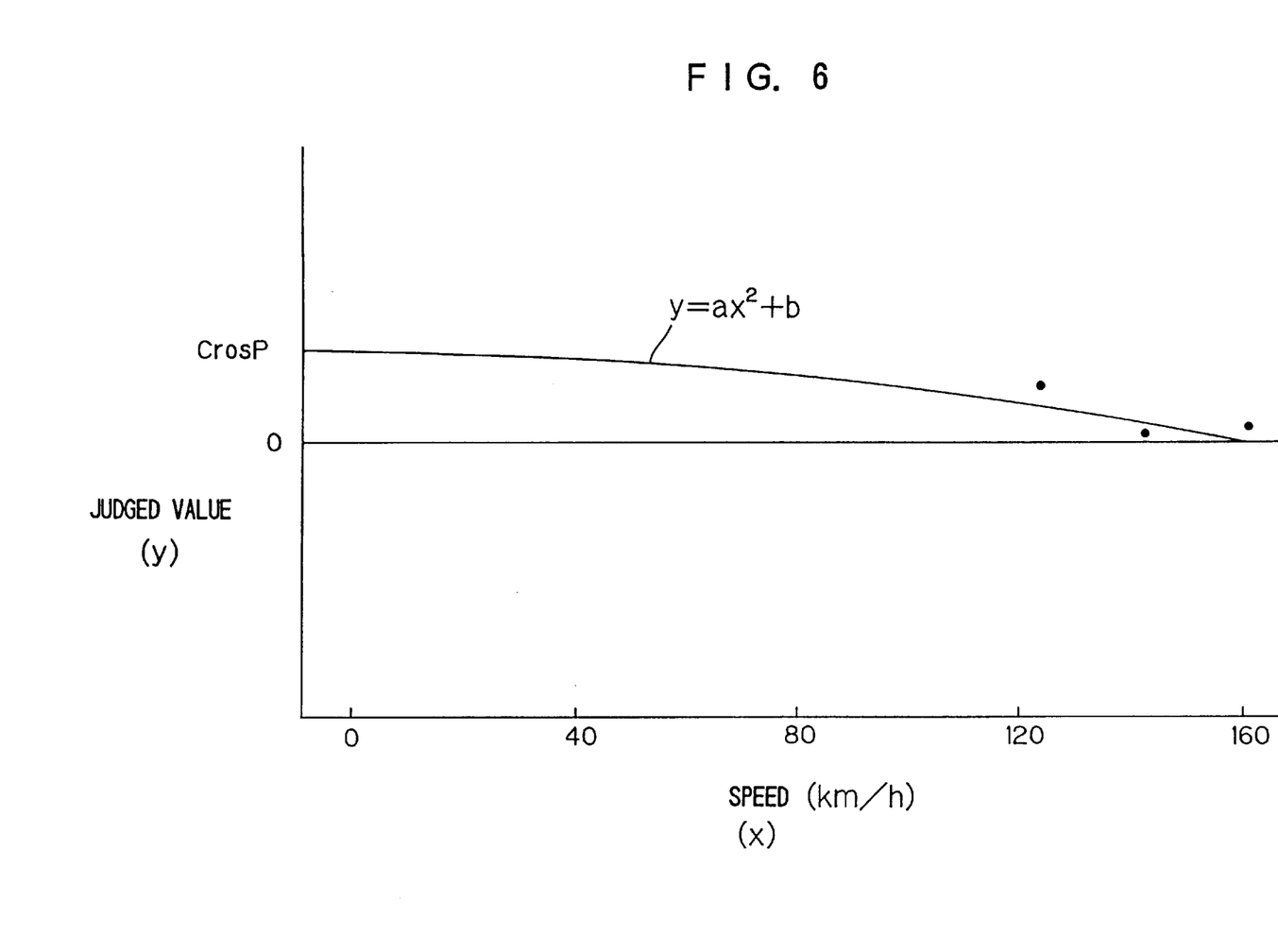
FIG. 6 is a graph for explaining a high-speed adapted judging processing.

In the high-speed adapted judgment, it is determined that the speed V of the vehicle, when the judged value D is calculated, belongs to which one of a plurality of previously set speed ranges, and the judged value D is classified into the speed range thus determined. After such a processing is repeated to reach the state where an average value of the judged values D can be calculated in each of three or more speed ranges, the average value of the judged values D in each speed range is calculated. Then, these average values are plotted in a graph as shown in FIG. 6 and are subjected to a regression processing by applying the least squares method to the respective plots. Consequently, a judged value CrosP when the speed V of the vehicle is 0 is assumed. Then, it is judged whether this assumed judged value CrosP satisfies the judging expression such as the above expression (2) or not.

If the judged value CrosP satisfies the judging expression, it is judged that a tire $W_i$ whose pneumatic pressure has dropped is present. If the judged value CrosP does not satisfy the judging expression, it is judged that all tires $W_i$ have a normal inner pressure. Consequently, it can be detected that a tire $W_i$ whose pneumatic pressure has dropped is present even if the vehicle is in a state of high-speed drive traveling with a tire $W_i$ whose pneumatic pressure has dropped.

However, according to this suggested technique, the judged value CrosP can not be assumed if the average values of the judged values D can not be calculated in a plurality of speed ranges. In other words, a high-speed adapted judgment can not be performed if the speed V of the vehicle does not substantially vary. Accordingly, even at the time of high-speed traveling, the high-speed adapted judgment can not be performed by the above suggested technique at the time of autocruise traveling where the speed V of the vehicle is substantially constant. That is, at the time of autocruise traveling, only a low-speed adapted judgment is performed based on the judged value D which is influenced by the speed V of the vehicle. Accordingly, when the vehicle is in a state of autocruise traveling with high speed, there is a fear of causing an erroneous judgment of the pneumatic pressure drop.

Suggested in Japanese Patent Application No. 8-12122 (not published as of the day of filing of the present application) is a technique of executing a pneumatic pressure drop judgment that is performed only at the time of deceleration when the vehicle is traveling with high speed. That is, since the judged value D becomes comparatively large value at the time of deceleration, the pneumatic pressure drop can be detected by performing the pneumatic pressure drop judgment at the time of deceleration even when the vehicle is in a high-speed traveling.

However, even if this technique is used, the pneumatic pressure drop judgment adapted to the high-speed traveling is not performed when the vehicle is in a state of autocruise traveling (traveling under cruise control) with high speed; therefore, there is a fear of causing an erroneous judgment of the pneumatic pressure drop.

Thus, no technique which has ever been suggested is adaptable to high-speed autocruise traveling.

An object of the present invention is to provide a tire pressure drop detecting method, capable of certainly detecting whether the tire pressure has dropped or not, even if the vehicle is in a state of autocruise traveling with high speed.

Another object of the present invention is to provide a tire pressure drop detecting device for carrying out such a method.

According to the present invention, when it is discriminated that the vehicle is in a state of autocruise traveling, a pneumatic pressure drop judging processing for autocruise traveling is executed. Consequently, it is possible to accurately detect whether the tire pressure has dropped or not even if the vehicle is in a state of autocruise traveling with high speed.

In one embodiment of the present invention, it is discriminated whether the vehicle is in a state of autocruise traveling or not based on the front/rear acceleration of the vehicle determined based on the rotational angular velocities of the tires. Consequently, it is not necessary to incorporate an autocruise signal given from an autocruise switch provided for the vehicle. Accordingly, the tire pressure drop detecting device can be realized at a low price.

In one embodiment of the present invention, a judged value for pneumatic pressure drop judgment is calculated based on the rotational angular velocities of the tires provided for the vehicle. By comparing this judged value with a judging threshold value, it is judged whether the tire pressure has dropped or not.

In this case, it is preferred that the judging threshold value is set to become smaller as the speed of the vehicle becomes higher. At the time of high-speed drive traveling, a slip rate of the tire whose pneumatic pressure has dropped is lowered, while the effective rolling radius is increased by a centrifugal force applied to the respective parts of the tire. Therefore, the rotational angular velocity of a tire becomes smaller than that at the time of low-speed traveling. Even in such a case, the tire pressure drop can be accurately detected by changing the judging threshold value according to the speed of the vehicle.

In one embodiment of the present invention, when it is discriminated that an absolute value of a lateral acceleration of the vehicle is less than an acceleration threshold value, it is judged that the vehicle is traveling, almost linearly, and the judged value and the speed of the vehicle in this case are held or stored. As a result, the judged value and the speed of the vehicle hardly containing an error are held. That is, when the vehicle is traveling at a corner, there is a fear of causing a transfer of the load of the vehicle or a lateral slip of the tire; therefore, there is much possibility that the judged value determined in this case and the speed of the vehicle contain the error.

On the other hand, when it is discriminated that the vehicle is in a state of autocruise traveling, the above held judged value and speed of the vehicle may be leveled so as to exclude the error in high accuracy. Among judging threshold values which are set to become smaller as the speed of the vehicle becomes larger, a judging threshold value corresponding to the leveled speed of the vehicle is preferably obtained, and it is preferred to judge whether the tire pressure has dropped or not based on this obtained judged value and leveled judged value. Therefore, the tire pressure drop can be certainly detected even at the time of high-speed drive traveling.

Besides, since only a judged value which hardly includes an error calculated when the vehicle is traveling, almost linearly, is held and this held judged value is used for the pneumatic pressure drop judging processing after leveling, the pneumatic pressure drop judging processing can be performed in high accuracy.

The above objects as well as other objects, features and effects of the present invention will become more apparent to those skilled in the art from the following description with reference to the accompanying drawings.

DESCRIPTION OF THE PREFERRED EMBODIMENTS

Figure 1:
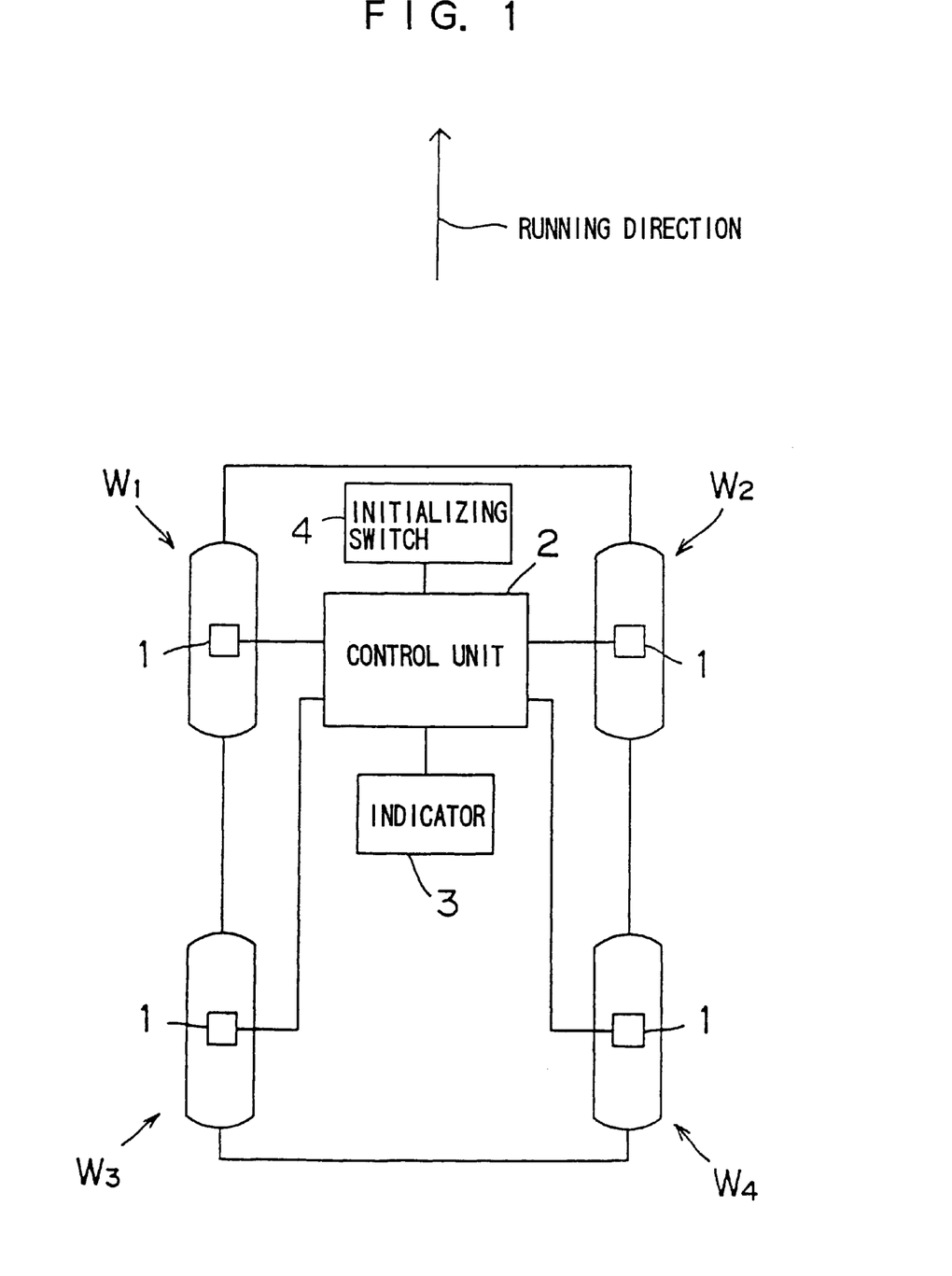
FIG. 1 is a block diagram showing the construction of a tire pressure drop detecting device according to one embodiment of the present invention.

FIG. 1 is a schematic block diagram showing the construction of a tire pressure drop detecting device to which one embodiment of the present invention is applied. This tire pressure drop detecting device detects whether the pneumatic pressures of any one of four tires $W_1$, $W_2$, $W_3$ and $W_4$ provided for a four-tire vehicle drop or not, respectively. The tires $W_1$ and $W_2$ correspond to right front and left front tires, and the tires $W_3$ and $W_4$ correspond to right rear and left rear tires, respectively.

This tire pressure drop detecting device is equipped with wheel speed sensors 1, which are associated with the tires $W_1$, $W_2$, $W_3$ and $W_4$, respectively. Output signals of each of the wheel speed sensors 1 are supplied to a control unit 2.

An indicator 3 is connected to the control unit 2. This indicator 3 informs the tire $W_i$ (i=1, 2, 3, 4,) whose pneumatic pressure has dropped, and is composed, for example, of a liquid crystal device, a plasma display device or a CRT.

To the control unit 2, an initializing switch 4 is also connected. The initializing switch 4 is operated by users to initiate the calculation of an initial correction factor $K_j$ (j=1, 2, 3) for excluding an influence of an initial difference of the tires $W_i$. The initial difference refers to a variation in effective rolling radius within the standard requirements, which arises among the respective tires $W_i$.

Figure 2:
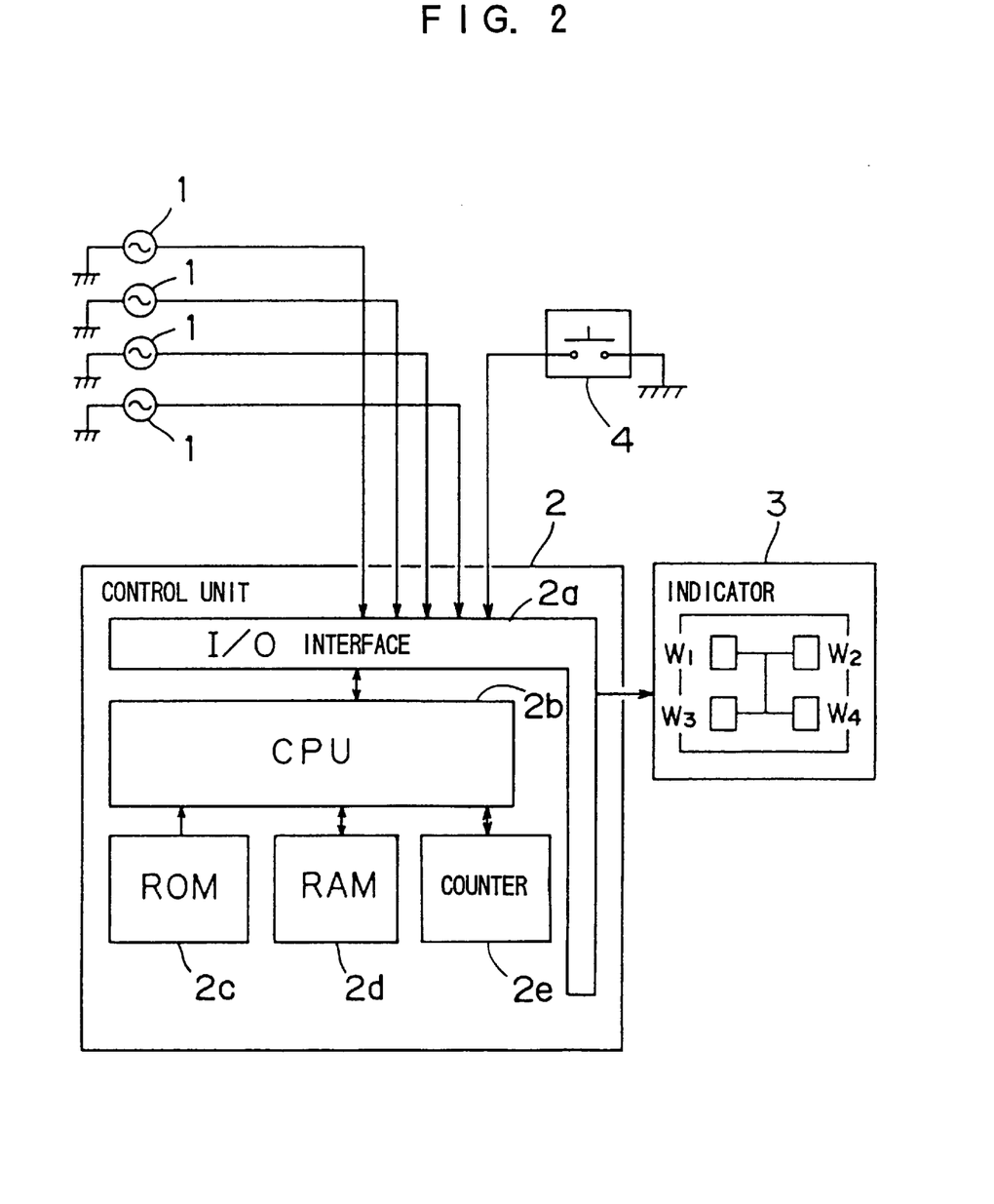
FIG. 2 is a block diagram showing the electrical construction of a control device.

FIG. 2 is a block diagram showing the electrical construction of a tire pressure drop detecting device. The control unit 2 is composed of a micro computer including an I/O interface 2a, a CPU 2b, a ROM 2c, a RAM 2d and a counter 2e.

The I/O interface 2a is required for sending and receiving signals to and from an external device including the wheel speed sensors 1 and the initializing switch 4. The CPU 2b is used for executing various operation processing according to a control program stored in the ROM 2c. The RAM 2d is that in which data, etc. are temporarily written to or the written data are read out from it when the CPU 2b performs a control or a calculation. The counter 2e stores a count value AC for a judgment whether the vehicle is autocruise driving or not.

Each of the wheel speed sensors 1 generates pulse signals corresponding to the rotating speed of the corresponding tire $W_i$ (referred to as a "wheel speed pulses" hereinafter). The CPU 2b calculates the rotational angular velocity $F_i$ of each tire $W_i$ based on the wheel speed pulses generated from the corresponding wheel speed sensor 1 for each predetermined sampling period $\Delta T$ (sec) (e.g. $\Delta T=1$).

Figure 3:
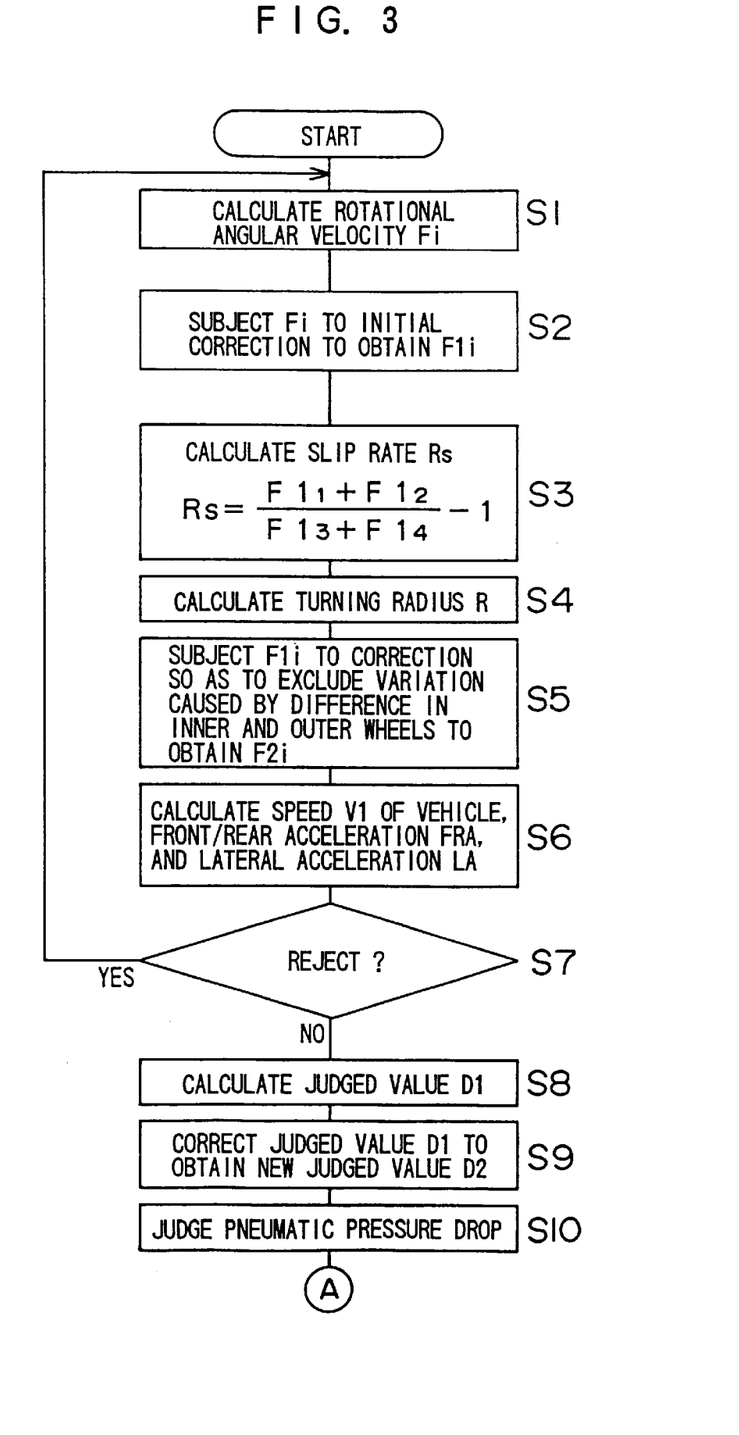
FIG. 3 is a flow chart for explaining a tire pressure drop detecting processing.
Figure 4:
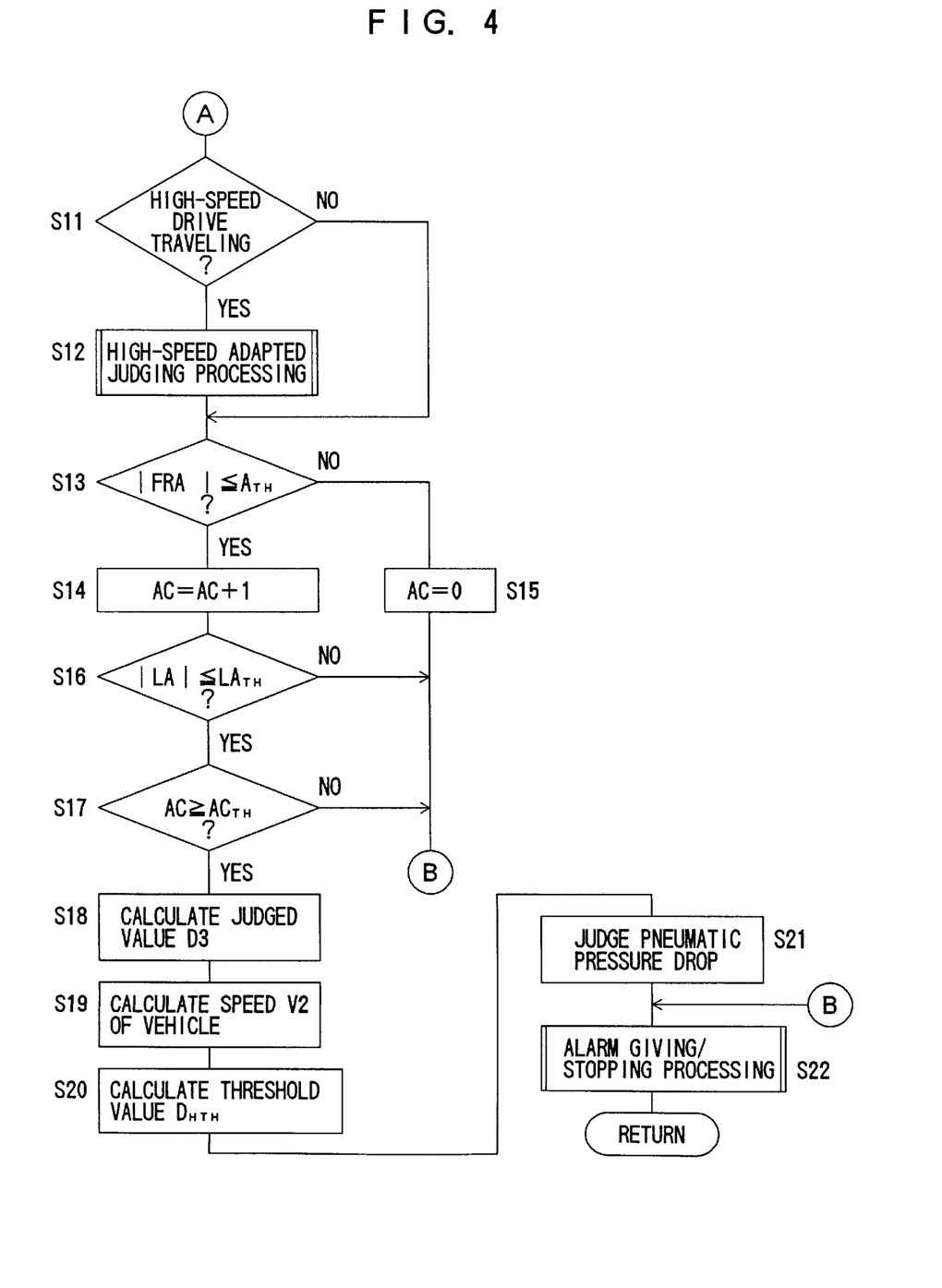
FIG. 4 is a flow chart for explaining the steps following those shown in FIG. 3.

FIG. 3 and FIG. 4 are flow charts for explaining the tire pressure drop detecting processing in the tire pressure drop detecting device. The CPU 2b operates according to a predetermined program stored in the ROM 2c so as to perform this processing by the function of control unit 2 for each judging period $\Delta T$. The following description will be made with respect to an FF (front engine-front drive) vehicle by means of an example of an objective vehicle.

According to this processing, the rotational angular velocity $F_i$ of each tire $W_i$ is firstly calculated based on the wheel speed pulses generated from each wheel speed sensor 1 (step S1).

The tires $W_i$ have the initial differences within manufacturing tolerance. Accordingly, the effective rolling radiuses of the respective tires $W_i$ are not the same, necessarily, even if all tires $W_i$ have a normal inner pressure. Therefore, the rotational angular velocity $F_i$ of each tire $W_i$ may vary. On the other hand, the judgment whether the pneumatic pressure of any tire $W_i$ has dropped or not is executed on the assumption that the rotational angular velocities $F_i$ of the respective tires $W_i$ are almost the same when all tires $W_i$ have a normal inner pressure. Accordingly, it is necessary to exclude the influence of the initial difference from the rotational angular velocities $F_i$.

Then, in order to exclude the influence of the initial difference from the calculated rotational angular velocities $F_i$, initial corrections on the rotational angular velocities $F_i$ is carried out (step S2). Specifically, the corrections according to the following equations (3) to (6) are performed to obtain corrected rotational angular velocities $F1_1$, $F1_2$, $F1_3$, and $F1_4$.

$$F1_1 = F_1 \quad (3)$$

$$F1_2 = K_1 \times F_2 \quad (4)$$

$$F1_3 = K_3 \times F_3 \quad (5)$$

$$F1_4 = K_2 33\ K_3 \times F_4 \quad (6)$$

An initial correction factor $K_1$ is a factor for correcting a difference in effective rolling radius due to the initial difference between the right front and left front tires $W_1$, $W_2$. An initial correction factor $K_2$ is a factor for correcting a difference in effective rolling radius due to the initial difference between the right rear and left rear tires $W_3$, $W_4$. An initial correction factor $K_3$ is a factor for correcting a difference in effective rolling radius due to the initial difference between the left front tire $W_1$ and left rear tire $W_3$.

The initial correction factor $K_j$ (j=1, 2, 3) is obtained, for example, when the vehicle is traveled for the first time, when any of the tires $W_i$ is filled with air or when any of the tires $W_i$ is replaced, and is stored in the ROM 2c of the control unit 2. In this connection, the ROM 2c is preferably composed of a programmable non-volatile memory such as an EPROM or an EEPROM.

The variation in rotational angular velocities $F_i$ of the tires $W_i$ is not caused only by the initial difference. For example, a difference in slip rate Rs between the right and left driving tires $W_1$, $W_2$ when the vehicle is traveling through a corner is one of the causes.

For example, when the vehicle is traveling through a corner, a lateral acceleration LA is exerted in the direction toward the outside of the corner and the load of the vehicle transfers toward the outside of the corner. As a result, the load applied on the tire on the inside to the corner relatively becomes small while the load applied on the tire on the outside to the corner relatively becomes large. Accordingly, the ground area of the tire on the inside to the corner relatively becomes small while the ground area of the tire on the outside to the corner comparatively becomes large.

Furthermore, a driving force generated in the engine is given to the tire on the inside to the corner and the tire on the outside to the corner, almost uniformly, by a differential gear. Accordingly, a difference in slip rate Rs between the driving tires $W_1$, $W_2$ arises. As a result, even if all tires $W_i$ have a normal inner pressure, a variation in rotational angular velocities between the tire on the inside to the corner and the tire on the outside to the corner arises.

Then, in order to exclude the influence of the slip rate Rs from the pneumatic pressure drop detection, the slip rate Rs of the driving tires $W_1$, $W_2$ is calculated (step S3) according to the following equation (7):

$$Rs = \frac{FI_1 + FI_2}{FI_3 + FI_4} - 1 \quad (7)$$

The calculated slip rate Rs is once stored in the RAM 2d. This slip rate Rs is used in case of correcting the judged value required for pneumatic pressure drop detection. That is, in case of correcting the judged value, the slip rate Rs of the driving tires $W_1$, $W_2$ and the lateral acceleration LA of the vehicle are used. Consequently, the difference in slip rate of the right and left tires $W_i$ can be corrected.

A difference in distance from the turning center between the tire on the inside to the corner and tire on the outside to the corner is also one of the causes of the variation in rotational angular velocities $F_i$ of the tires $W_i$. Furthermore, the load movement of the vehicle is also a cause of the variation in rotational angular velocities $F_i$.

Then, the turning radius R of the vehicle in which the influence of the load movement of the vehicle is excluded is calculated (step S4). More specifically, the speeds $V1_3$ and $V1_4$ of the following tires $W_3$ and $W_4$ are firstly calculated based on the rotational angular velocities $F1_3$ and $F1_4$ after initial correction, according to the following equations (8) and (9). In the following equations (8) and (9), r is a constant corresponding to the effective rolling radius at the time of the linear traveling.

$$V1_3 = r \times F1_3 \quad (8)$$

$$V1_4 = r \times F1_4 \quad (9)$$

Then, the turning radius R' of the vehicle is calculated based on the calculated speeds $V1_3$ and $V1_4$ of the following tires $W_3$ and $W_4$, according to the following equation (10). In the following equation (10), Tw indicates a tread width as a distance between the following tires $W_3$, $W_4$.

$$R'=Tw/2=(V1_4+V1_4)/(V1_4-V1_3) \quad (10)$$

This calculated turning radius R' of the vehicle is subjected to the correction by which the variation caused by the load movement of the vehicle is excluded, according to the following equation (11), thereby determining a turning radius R of the vehicle after correction.

$$R=R'\times\{u_1+u_2(V1_3+V1_4)^2\} \quad (11)$$

In this equation (11), $u_1$ and $u_2$ respectively indicate a constant which is previously stored in the ROM 2c. $u_1$ and $u_2$ are obtained, for example, by traveling with a constant speed on the road wherein the turning radius of the vehicle is previously known.

As $u_1$ and $u_2$, the following values are suitable.

$u_1=1$ $$u_2=(1/9.8)\times(\beta/2Tw)$$

where $\beta=(Q\times H\times\alpha)/2Tw$

Q: load of the vehicle

H: height from the ground surface of the tire to gravity center of the vehicle, and α: variation rate in effective rolling radius of the tire with respect to load Then, the rotational angular velocities $F1_i$ determined in the above step S2 are corrected based on the determined turning radius R of the vehicle in order to exclude the variation caused by the difference in distance between the respective tires $W_i$ and the turning center (step S5). Specifically, rotational angular velocities $F2_1$ to $F2_4$ after correction are determined according to the following equations (12) through (15). Incidentally, in the following equations (12) through (15), WB indicates a wheel base of the vehicle.

$$F2_1 = \frac{|R|}{\sqrt{\{(R-Tw/2)^2+WB^2\}}} \times Fl_1 \quad (12)$$

$$F2_2 = \frac{|R|}{\sqrt{\{(R+Tw/2)^2+WB^2\}}} \times Fl_2 \quad (13)$$

$$F2_3 = \frac{|R|}{|R-Tw/2|} \times Fl_3 \quad (14)$$

$$F2_4 = \frac{|R|}{|R+Tw/2|} \times Fl_4 \quad (15)$$

Consequently, the rotational angular velocities $F2_i$ in which the variation caused by the difference in distance from the turning center between the tire $W_i$ on the inside to the corner and tire $W_i$ on the outside to the corner (difference in inner and outer wheels) is excluded can be obtained.

On the other hand, the rotational angular velocity $F_i$ sometimes contain an error depending on the turning radius R of the vehicle, velocity V of the vehicle, lateral acceleration LA of the vehicle and magnitude of front/rear acceleration $FRA_i$ of each tire $W_i$.

That is, when the turning radius R of the vehicle is relatively small, the tires $W_i$ are likely to cause a lateral slip; therefore, there is much possibility that the rotational angular velocities $F_i$ calculated contain an error. In addition, when the speed V of the vehicle is considerably low, the detection precision of the wheel speed sensors 1 becomes inferior, considerably. Therefore, there is much possibility that the rotational angular velocities $F_i$ calculated contain an error.

Furthermore, when the lateral acceleration LA of the vehicle is comparatively large, the tires $W_i$ are likely to cause a lateral slip; therefore, there is much possibility that the rotational angular velocities $F_i$ calculated contain an error. Furthermore, when the front/rear acceleration $FRA_i$ of a tire $W_i$ is relatively large, for example, the influence of the slip of the tire $W_i$ due to rapid acceleration/deceleration of the vehicle or the influence of the breaking will be considered. Therefore, there is much possibility that the rotational angular velocities $F_i$ calculated contain an error.

In such cases where there is much possibility that the rotational angular velocities $F_i$ contain an error, it is preferred to reject the rotational angular velocities $F_i$ for the purpose of the detection of the pressure drop.

Then, the speed V1 of the vehicle, lateral acceleration LA and front/rear acceleration $FRA_i$ of each tire $W_i$ are calculated (step S6). More specifically, the speed V of the vehicle is calculated based on the speed $V1_i$ of each tire $W_i$. The velocity $V1_i$ of each tire $W_i$ is calculated according to the following equation (16):

$$V1_i=r\times F2_i \quad (16)$$

The speed V of the vehicle is calculated based on the calculated velocity $V1_i$ of each tire $W_i$ according to the following equation (17):

$$V1=(V1_1+V1_2+V1_3+V1_4)/4 \quad (17)$$

The lateral acceleration LA of the vehicle is calculated by utilizing this calculated speed V1 of the vehicle according to the following equation (18):

$$LA=V1^2/(R\times 9.8) \quad (18)$$

The front/rear acceleration $FRA_i$ of each tire $W_i$ is calculated according to the following equation (19) assuming the speed of each tire $W_i$ calculated in the judging period before one period be $BV1_i$.

$$FRA_i=(V1_i-BV1_i)/(\Delta T\times 9.8) \quad (19)$$

The numeral 9.8 in the denominator in the above equations (18) and (19) converts the lateral front/rear acceleration LA and the front/rear acceleration $FRA_i$ of each tire $W_i$ in gravity acceleration unit basis.

The speed V1 of the vehicle, lateral acceleration LA and front/rear acceleration $FRA_i$ of the vehicle may be directly determined by using sensors for detection thereof.

Then, on the basis of the turning radius R of the vehicle, velocity V of the vehicle, front/rear acceleration $FRA_i$ of each tire $W_i$ and lateral acceleration LA of the vehicle, it is judged whether the rotational angular velocities $F_i$ calculated at the time of this sampling should be rejected or not (step S7). Specifically, the rotational angular velocities $F_i$ are rejected if at least one of the following four conditions 1̂ to 0̂ is satisfied:

1̂ $R<R_{TH}$ (e.g. $R_{TH}=30$ m)

2̂ $V<V_{TH}$ (e.g. $V_{TH}=10$ km/h)

3̂ MAX $\{|FRA_i|\}>A_{TH}$ (e.g. $A_{TH}=0.1$ g, g=9.8 (m/sec$^2$))

4̂ $LA>G_{TH}$ (e.g. $G_{TH}=0.4$ g)

As a result of the judgment in the step S7, if the rotational angular velocities $F_i$ are not rejected, the judged value D1 is calculated based on the rotational angular velocity $F2_i$ obtained in the step S5 according to the following equation (20) (step S8):

$$D1 = \frac{\frac{F2_1 + F2_4}{2} - \frac{F2_2 + F2_3}{2}}{\frac{F2_1 + F2_2 + F2_3 + F2_4}{4}} \times 100 \tag{20}$$

In the calculation of the speed V1 of the vehicle, lateral acceleration LA and front/rear acceleration $FRA_i$ of each tire $W_i$ in the step S6, the rotational angular velocities $F2_i$ corrected according to the initial difference and difference in inner and outer wheels of the tire $W_i$ are used. As mentioned above, the rotational angular velocities $F_i$ of the tires $W_i$ depend on not only initial difference and difference in inner and outer wheels, but also lateral acceleration LA and slip rate Rs. Accordingly, the influence of variable factors including the lateral acceleration LA and slip rate Rs is exerted on the judged value D1 determined in the step S8.

Then, the correction for excluding the influence of the above variable factors on the judged value D1 calculated in the step S8 is carried out (step S9). Specifically, a corrected value C is determined based on the slip rate Rs determined in the step S3 and the lateral acceleration LA of the vehicle determined in the step S6 according to the following equation (21). Then, as shown in the following equation (22), the corrected value C is subtracted from the judged value D1. Consequently, a new judged value D2 wherein the influence of the above variable factors is excluded is obtained.

$$C = \alpha1 \times LA - \alpha2 \times LA \times Rs \tag{21}$$

$$D2 = D1 - C \tag{22}$$

In the above formula (21), $\alpha1$ and $\alpha2$ respectively indicate factors which are previously restored in the ROM 2c. The factors $\alpha1$ and $\alpha2$ are determined by performing a test traveling when it is known that all the tires $W_i$ have a normal inner pressure.

The following equation is established from the above equations (21) and (22).

$$D1 = D2 + C = D2 + \alpha1 \times LA - \alpha2 \times LA \times Rs$$

When the vehicle is allowed to travel by inertia or coast without applying a driving torque, Rs=0. Accordingly, the following equation is established at this time.

$$D1 = D2 + \alpha1 \times LA$$

Then, when a plurality of relations between the lateral acceleration during the inertia traveling or coasting and the judged value D1 during the test traveling, and these relations are approximated by a first order equation or liner expression, a gradient of a straight line of the first order equation becomes $\alpha1$.

Using $\alpha1$ thus obtained, while the vehicle is allowed to travel by applying the driving torque to the wheels, the judged values D1, the lateral accelerations and the slip rate Rs are calculated. It is apparent that the following equation is established from the above equations.

$$D1 - \alpha1 \times LA = -\alpha2 \times LA \times Rs + D2$$

Then, when a plurality of relations between $D1-\alpha1 \times LA$ and $-\alpha2 \times LA \times Rs$ from data obtained during the test traveling and this relation is approximated by a first order equation, a gradient of a straight line of this first order equation becomes $-\alpha2$.

When the judged value D2 is determined (step S9), it is judged whether a tire $W_i$ whose pneumatic pressure has dropped is present or not using this judged value D2 (step S10). Specifically, it is discriminated whether the judged value D2 satisfies the following expression (23) or not. In the following expression (23), $D_{TH1}=D_{TH2}=0.1$, for example.

$$D2 < -D_{TH1} \text{ or } D2 > D_{TH2} \tag{23}$$

If the judged value D2 satisfies the above expression (23), it is judged that the pneumatic pressure of at least one of the tires $W_i$ has dropped, and a low-speed alarm flag for giving/stopping of an alarm is set. On the other hand, if the judged value D2 does not satisfy the above expression (23), it is judged that there is no tire whose pneumatic pressure has dropped, and a low-speed alarm flag is reset.

When the vehicle is traveling with increasing the speed at high-speed range, or when the vehicle is traveling with maintaining a nearly constant speed at high-speed range (hereinafter refereed to as a "high-speed drive traveling"), the slip rate of the tire $W_i$ whose pneumatic pressure has dropped is lowered. At the same time, since the effective rolling radius increases by a centrifugal force applied to each part of the tire $W_i$, the above judged value D becomes nearly 0 even when the pneumatic pressure of the tire $W_i$ has dropped. Therefore, an erroneous judgment cannot be avoided only by the above judgment of the step S10.

To the contrary, when the vehicle is traveling with decelerating even at high-speed range, the judged value D2 becomes a comparatively large value as in case of the low-speed traveling and the pressure drop can be accurately judged in the above judgment of the step S10. Therefore, the above judgment of the step 10 will suffice in such case.

Then, it is discriminated whether the vehicle is in a state of high-speed drive traveling or not (step S11 of FIG. 4). If the vehicle is in a state of high-speed drive traveling, the high-speed adaptation judging processing is executed (step S12).

It is discriminated whether the vehicle is in a state of high-speed drive traveling or not based on the speed V1 of the vehicle and the front/rear acceleration FRA of the vehicle. That is, if the speed V1 of the vehicle is not less than a predetermined threshold value $V_{TH}$ (e.g. $V_{TH}$=120 km/h) and the front/rear acceleration FRA of the vehicle is not less than a predetermined threshold value $A_{TH}$ (e.g. $A_{TH}$=0 g), it is discriminated that the vehicle is in a state of high-speed drive traveling.

In the high-speed adapted judging processing, it is determined that the speed V of the vehicle at the time when the judged value D2 is calculated, belongs to which one of a plurality of previously set speed ranges, and the judged value D2 is classified into the speed range thus determined. When such a processing is repeated to reach the state where an average value of the judged values D2 can be calculated in three or more speed ranges, the average value of the judged values D2 in the corresponding speed range is calculated and the corresponding average values are plotted in a graph as shown in FIG. 6. Then, these plots are subjected to a regression processing by the least squares method. Consequently, a judged value CrosP when the speed V of the vehicle is 0, which reflects the state of the pneumatic pressure of the tire $W_i$, is assumed or estimated. Then, it is judged whether this assumed judged value CrosP satisfies a predetermined judging expression (e.g. judging expression such as the above expression (2)) or not.

If the judged value CrosP satisfies the judging expression, it is judged that a tire $W_i$ whose pneumatic pressure has dropped is present and a high-speed alarm flag for indicating the giving/stopping of the alarm is set. On the other hand, if the judged value CrosP does not satisfy the judging expression, it is judged that all tires $W_i$ have a normal inner pressure, and a high-speed flag is reset.

In such way, when the vehicle is in a state of high-speed drive traveling, the high-speed adapted judging processing which is suitable for high-speed drive traveling is executed. Therefore, even if the vehicle is high-speed traveling, it is certainly judged whether the pneumatic pressure of any of the tires $W_i$ has dropped or not.

On the other hand, in the high-speed adapted judging processing, as described above, the average value of the judged values D2 corresponding to three or more speed ranges is required. That is, even if the vehicle is in a state of high-speed drive traveling, it is impossible to correctly judge the pneumatic pressure drop by the above-described high-speed adaptated judging processing if the speed of the vehicle does not vary.

On the other hand, an autocruise traveling wherein the speed V1 of the vehicle is nearly constant is also included in the high-speed drive traveling, as described above. Accordingly, when the vehicle is in a state of autocruise traveling with high speed, it is impossible to judge the pneumatic pressure drop in the above-described high-speed adaptated judging processing.

Then, an autocruise adapted processing as a pneumatic pressure drop judging processing for autocruise traveling is executed (steps S13 to S21). The autocruise adaptated processing is classified roughly into a pre-processing and a processing for executing the pneumatic pressure drop judging processing for autocruising.

First, the pre-processing will be explained. The pre-processing is a processing for collecting data which is required to execute the pneumatic pressure drop judging processing for autocruising, while judging whether the vehicle is autocruise traveling or not.

It is judged, by the fact the absolute value of the front/rear acceleration FRA of the vehicle is not more than the threshold value $A_{TH}$ (e.g. $A_{TH}$=0.025 g) for a predetermined time (e.g. 60 sec) or more, whether the vehicle is in a state of autocruise traveling or not.

That is, it is discriminated whether the absolute value of the front/rear acceleration FRA of the vehicle is not more than the threshold value $A_{TH}$ (step S13). If the absolute value of the front/rear acceleration FRA is larger than the threshold value $A_{TH}$, it is judged that the vehicle is not autocruise traveling and a count value AC of the counter 2e is cleared (step S15). On the other hand, if the absolute value of the front/rear acceleration FRA is smaller than the threshold value $A_{TH}$, it is judged that there is a possibility that the vehicle is in a state of autocruise traveling and a count value AC of the counter 2e is incremented (step S14).

In such way, the count value AC of the counter 2e increases when the vehicle is in a state of autocruise traveling and, if not, it is cleared. Accordingly, when the count value AC of the counter 2e is not less than a predetermined value (e.g. 60), it is possible to discriminate that the vehicle is in a state of autocruise traveling.

On the other hand, when the vehicle is not traveling linearly (not traveling at the corner), an error is included in the judged value D2. This error can be ignored in the reject processing (step S7) and the correction processing (step S9) which are performed before the autocruise adaptated processing is executed, but can not be ignored in the autocruise adaptated processing. Because the threshold value used in case of the pneumatic pressure drop judgment may be a variable value in the autocruise adaptation processing, as described hereinafter.

Then, it is discriminated whether the absolute value of the lateral acceleration LA is not more than a predetermined threshold value $LA_{TH}$ (e.g. $LA_{TH}$=0.05 g) or not (step S16). If it is larger than the threshold value $LA_{TH}$, it is judged that an error is included in the judged value D2 and the autocruise adaptated processing is terminated. On the other hand, if it is not more than the threshold value $LA_{TH}$, the step proceeds to the following step S17.

In the step S17, it is discriminated whether the vehicle is in a state of autocruise traveling or not with reference to the count value AC of the counter 2e. Specifically, it is discriminated whether the count value AC is not less than a predetermined threshold value $AC_{TH}$ (e.g. $AC_{TH}$=60) or no.

If the count value AC is less than the threshold value $AC_{TH}$, it is judged that it is too early to judge whether the vehicle is in a state of autocruise traveling, and the autocruise adaptated processing is terminated. On the other hand, if the count value AC is not less than the threshold value $AC_{TH}$, the step transfers to the pneumatic pressure drop judging processing for autocruising.

When the vehicle is in a state of autocruise traveling, the judged value D2 and the speed V1 of the vehicle are substantially constant. However, the judged value D2 and the speed V1 of the vehicle may sometimes include an error by an unexpected noise.

Then, in the pneumatic pressure drop judging processing for autocruising, the judged value D2 and the speed V1 of the vehicle are leveled or smoothed to calculate a judged value D3 and a speed V2 of the vehicle, wherein the error is excluded.

Specifically, the judged value D3 is calculated according to the following equation (24) (step S18). Incidentally, so far as the condition of the step S17 is established for the first time, D3=D2.

$$D3=(59/60) \times D3+(1/60) \times D2 \tag{24}$$

Furthermore, the speed V2 of the vehicle is calculated according to the following equation (25) (step S19). Incidentally, so far as the condition of the step S17 is established for the first time, V2=V1.

$$V2=(59/60) \times V2+(1/60) \times V1 \tag{25}$$

When the vehicle is in a state of autocruise traveling at high-speed range, as described above, the slip rate is lowered and the effective rolling radius of a tire $W_i$ increases, which results in decrease of the judged value D3. Accordingly, when the threshold value for judging is fixed to the same value as that in case of low-speed traveling, there is a fear of causing an erroneous judgment.

Figure 5:
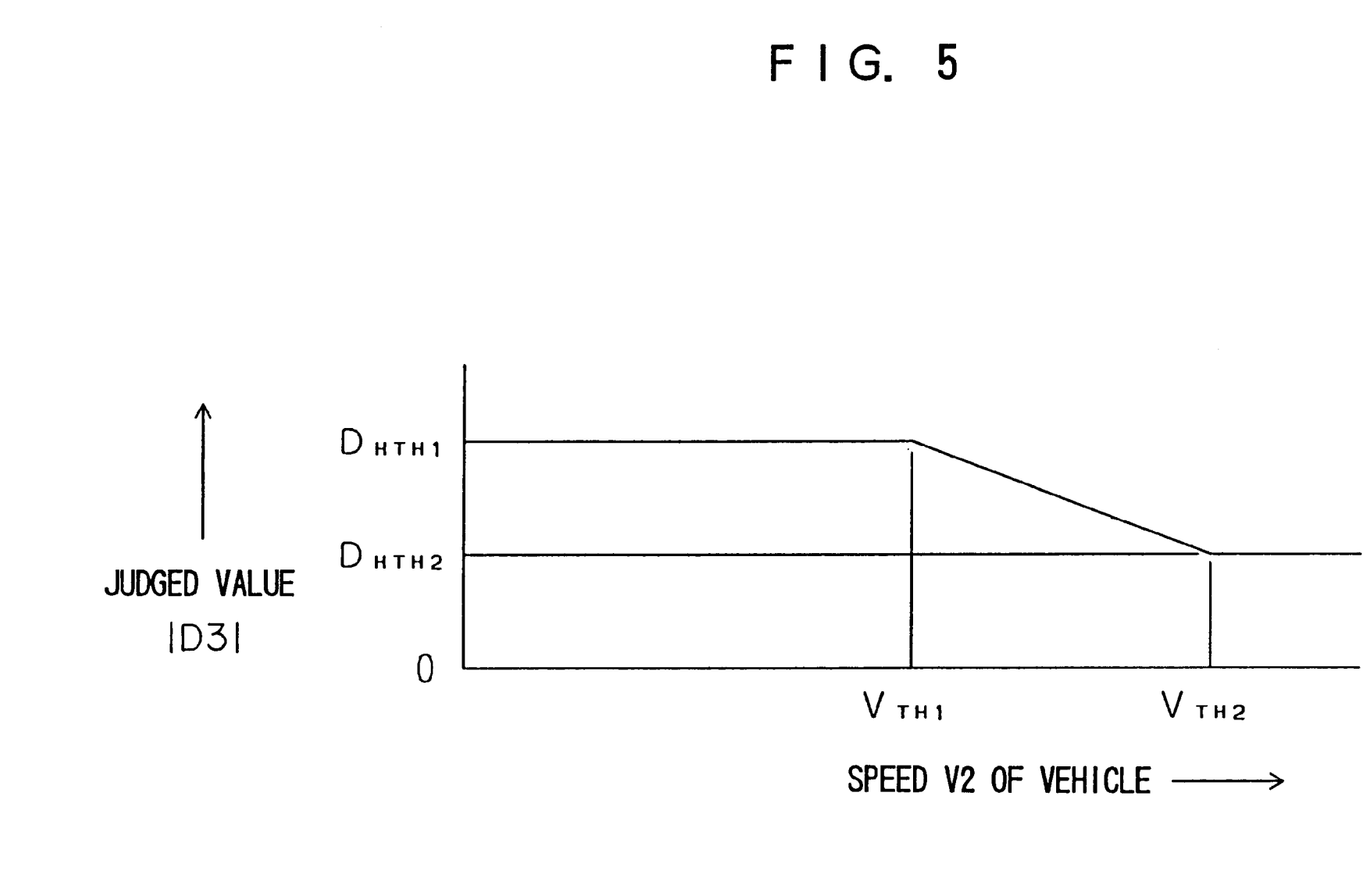
FIG. 5 is a graph for explaining a judging threshold value used for an autocruise adapted processing.

Then, in the pneumatic pressure drop judging processing for autocruising, a judging threshold value $D_{HTH}$ is set to become smaller as the speed V2 of the vehicle becomes larger. More specifically, the judging threshold value DHTH is set corresponding to the speed V2 of of the vehicle classified into three stages such as 0 to $V_{TH1}$, $V_{TH1}$ to $V_{TH2}$ and $V_{TH2}$ or more, as shown in FIG. 5. More specifically, the judging threshold value $D_{HTH}$ is set as shown in the following equations (26) to (28). The following equations (26) to (28) are previously stored in the ROM 2c. β1 and β2 respectively indicate predetermined constants.

$$D_{HTH}=D_{HTH1}(V2<V_{TH1}) \tag{26}$$

$$D_{HTH}=\beta1 \times V1+\beta2(V_{TH1} \leq V2 \leq V_{TH2}) \tag{27}$$

$$D_{HTH}=D_{HTH2}(V2<V_{TH2}) \tag{28}$$

In this processing, it is examined that the calculated speed V2 of of the vehicle belongs to which one of stages, and a judging threshold value corresponding to the results is read out (step S20).

In the above equations (26) to (28), $D_{HTH1}$ may be set to 0.1, $V_{TH1}$ may be set to 120 (km/h) and $V_{TH2}$ may be set to 200 (km/h). Furthermore, $D_{TH2}$, is set to a value wherein an erroneous judgment is not caused even in case of linear traveling in the state where all tires $W_i$ have a normal inner pressure, for example, it is set to 0.03.

Then, it is discriminated whether the following expression (29) is satisfied or not based on the judged value D3 and the obtained judging threshold value $D_{HTH}$ (step S21).

$$|D3| \leq D_{HTH} \qquad (29)$$

If the above expression (29) is satisfied, it is judged that all tires $W_i$ have a normal inner pressure and the autocruise alarm flag for indicating the giving/stopping of the alarm is reset. On the other hand, if the above expression (29) is not satisfied, it is judged that a tire $W_i$ whose pneumatic pressure has dropped is present and the autocruise alarm flag is set.

After the completion of the above processing, the alarm giving/stopping processing is executed (step S22). In the alarm giving/stopping processing, it is discriminated whether any one of the low-speed alarm flag, high-speed alarm flag and autocruise alarm flag is set or not. As a result, if any one of the above three flags is set, an alarm signal is given to the indicator 3. In the indicator 3, when the alarm signal is given, a indication lamp provided for the indicator 3 is switched on. Consequently, it is informed that the pneumatic pressure of any of the tires $W_i$ has dropped.

In such way, according to the tire pressure drop detecting device of the present embodiment, when the vehicle is in a state of autocruise traveling, the autocruise adaptated processing for autocruise traveling is executed based on the judged value D3, which is determined when the vehicle is traveling almost linearly and further subjected to a leveling processing, and the judging threshold value $D_{HTH}$ set to becomes smaller as the speed becomes higher. Accordingly, even if the vehicle is in a state of autocruise traveling at high speed range, it is possible to certainly detect that the pneumatic pressure of any of the tires $W_i$ has dropped. Therefore, a tire pressure drop detecting device with high accuracy can be obtained.

The embodiments of the present invention have been described in detail, hereinabove, but the description should be considered as illustrative and not restrictive, the spirit and scope of the present invention being limited only by the appended claims.

This application is based on a Japanese patent application No. 8-255750 filed on Sep. 27, 1996 in the Japanese Patent Office, the entire disclosure of which is incorporated hereinto by reference.

What is claimed is:

1. A tire pressure drop detecting method, comprising the steps of:
   detecting rotational angular velocities of tires provided for a vehicle,
   discriminating whether the vehicle is in a state of autocruise traveling or not, and
   executing a pneumatic pressure drop judging processing for autocruise traveling based on the detected rotational angular velocities when it is discriminated that the vehicle is in a state of autocruise traveling.

2. A method according to claim 1, further comprising the step of detecting a front/rear acceleration of the vehicle based on the detected rotational angular velocities,
   wherein the step of discriminating whether the vehicle is in a state of autocruise traveling or not includes the step of performing the discrimination based on the detected front/rear acceleration of the vehicle.

3. A method according to claim 1, further comprising the steps of:
   calculating a judged value based on the detected rotational angular velocities, and
   calculating a speed of the vehicle based on the detected rotational angular velocities,
   wherein the step of executing the pneumatic pressure drop judging processing for autocruise driving includes the steps of:
   obtaining a judging threshold value corresponding to the calculated speed of the vehicle among judging threshold values which are set to become smaller as the speed of the vehicle becomes larger, and
   judging whether the tire pressure has dropped or not based on this obtained judging threshold value and the calculated judged value.

4. A method according to claim 1, further comprising the steps of:
   calculating a judged value based on the detected rotational angular velocities,
   calculating a speed of the vehicle based on the detected rotational angular velocities,
   calculating a lateral acceleration of the vehicle based on the detected rotational angular velocities,
   discriminating whether an absolute value of this calculated lateral acceleration of the vehicle is less than a predetermined acceleration threshold value, and
   holding the calculated judged value when it is judged that the absolute value of the lateral acceleration of the vehicle is less than the acceleration threshold value,
   wherein the step of executing the pneumatic pressure drop judging processing for autocruise traveling includes the steps of:
   leveling the held judged value,
   obtaining a judging threshold value corresponding to the calculated speed of the vehicle among judging threshold values which are set to become smaller as the speed of the vehicle becomes larger, and
   judging whether the tire pressure has dropped or not based on this obtained judging threshold value and the leveled judged value.

5. A method according to claim 4, further comprising the steps of:
   holding the calculated speed of the vehicle when it is judged that the absolute value of the lateral acceleration of the vehicle is less than the acceleration threshold value, and
   leveling the held speed of the vehicle,
   wherein the step of obtaining the judging threshold value includes the step of obtaining the judging threshold value corresponding to the leveled speed of the vehicle.

6. A method according to claim 1, further comprising the step of:
   calculating a judged value based on the detected rotational angular velocities, and
   a low-speed adapted judging step of judging whether the tire pressure has dropped or not by comparing this judged value with a constant threshold value for low-speed traveling.

7. A method according to claim 1, further comprising the steps of:

calculating a judged value based on the detected rotational angular velocities, discriminating whether the vehicle is in a state of high-speed drive traveling or not, and a high-speed adaptation judging step of assuming a judged value in case that the speed of the vehicle is nearly zero based on the above calculated judged value when it is discriminated that the vehicle is in a state of high-speed drive traveling, and judging whether the tire pressure has dropped or not based on the assumed judged value.

8. A tire pressure drop detecting device, comprising:

rotational angular velocity detecting means for detecting rotational angular velocities of tires provided for a vehicle, autocruise discriminating means for discriminating whether the vehicle is in a state of autocruise traveling or not, and processing executing means for executing a pneumatic pressure drop judging processing for autocruise traveling based on the rotational angular velocities detected by the rotational angular velocity detecting means when it is discriminated that the vehicle is in a state of autocruise traveling.

9. A tire pressure drop detecting device according to claim 8, further comprising front/rear acceleration detecting means for detecting a front/rear acceleration of the vehicle, wherein the autocruise discriminating means discriminate whether the vehicle is in a state of autocruise traveling or not based on the front/rear acceleration of the vehicle detected by the front/rear acceleration detecting means.

10. A tire pressure drop detecting device according to claim 8, further comprising:

judged value operating means for calculating a judged value based on the rotational angular velocities detected by the rotational angular velocity detecting means, and speed calculating means for calculating a speed of the vehicle based on the rotational angular velocities detected by the rotational angular velocity detecting means, wherein the processing executing means includes:

obtaining means for obtaining a judging threshold value corresponding to the speed of the vehicle calculated by the speed calculating means among judging threshold values which are set to become smaller as the speed of the vehicle becomes larger, and judging means for judging whether the tire pressure has dropped or not based on the judging threshold value obtained by the obtaining means and the judged value calculated by the judged value operating means.

11. A tire pressure drop detecting device according to claim 8, further comprising:

judged value operating means for calculating a judged value based on the rotational angular velocities detected by the rotational angular velocity detecting means, speed calculating means for calculating a speed of the vehicle based on the rotational angular velocities detected by the rotational angular velocity detecting means, lateral acceleration operating means for calculating a lateral acceleration of the vehicle based on the rotational angular velocities detected by the rotational angular velocity detecting means, acceleration discriminating means for discriminating whether an absolute value of the lateral acceleration of the vehicle calculated by the lateral acceleration operating means is less than a predetermined acceleration threshold value, and judged value holding means for holding the judged value calculated by the judged value operating means when it is judged by the acceleration discriminating means that the absolute value of the lateral acceleration of the vehicle is less than the acceleration threshold value, wherein the processing executing means includes:

leveling means for leveling the judged value held by the holding means and the speed of the vehicle, judging threshold value obtaining means for obtaining a judging threshold value corresponding to the speed of the vehicle among judging threshold values which are set to become smaller as the speed of the vehicle becomes larger, and judging means for judging whether the tire pressure has dropped or not based on the judging threshold value obtained by the judging threshold value obtaining means and the judged value leveled by the leveling means.

12. A tire pressure drop detecting device according to claim 11, further comprising:

speed holding means for holding the calculated speed of the vehicle when it is judged that the absolute value of the lateral acceleration of the vehicle is less than the acceleration threshold value, and speed leveling means for leveling the held speed of the vehicle, wherein the judging threshold value obtaining means obtains a judging threshold value corresponding to the leveled speed of the vehicle.

13. A tire pressure drop detecting device according to claim 8, further comprising:

judged value calculating means for calculating a judged value based on the detected rotational angular velocities, and low-speed adapted judging means for judging whether the tire pressure has dropped or not by comparing this calculated judged value with a constant threshold value for low-speed traveling.

14. A tire pressure drop detecting device according to claim 8, further comprising:

judged value calculating means for calculating a judged value based on the detected rotational angular velocities, high-speed drive discriminating means for discriminating whether the vehicle is in a state of high-speed drive traveling or not, and high-speed adapted judging means for assuming a judged value in case that the speed of the vehicle is nearly zero based on the above calculated judged value when it is discriminated that the vehicle is in a state of high-speed drive traveling, and judging whether the tire pressure has dropped or not based on the assumed judged value.

* * * * *